(12) United States Patent
Mascia

(10) Patent No.: US 11,707,694 B2
(45) Date of Patent: Jul. 25, 2023

(54) MESSAGE DELIVERY APPARATUS AND METHODS

(71) Applicant: Virginie Mascia, Jacksonville, FL (US)

(72) Inventor: Virginie Mascia, Jacksonville, FL (US)

( * ) Notice: Subject to any disclaimer, the term of this patent is extended or adjusted under 35 U.S.C. 154(b) by 67 days.

(21) Appl. No.: 17/112,821

(22) Filed: Dec. 4, 2020

(65) Prior Publication Data
US 2021/0170297 A1    Jun. 10, 2021

Related U.S. Application Data

(60) Provisional application No. 62/944,993, filed on Dec. 6, 2019.

(51) Int. Cl.
| | | |
|---|---|---|
| *A63H 33/30* | (2006.01) | |
| *A63H 3/28* | (2006.01) | |
| *G10L 25/63* | (2013.01) | |
| *H04L 51/10* | (2022.01) | |
| *G06V 40/16* | (2022.01) | |
| *H04N 23/51* | (2023.01) | |

(52) U.S. Cl.
CPC .......... *A63H 33/3016* (2013.01); *A63H 3/28* (2013.01); *G06V 40/174* (2022.01); *G10L 25/63* (2013.01); *H04L 51/10* (2013.01); *H04N 23/51* (2023.01); *A63H 2200/00* (2013.01)

(58) Field of Classification Search
CPC .. A63H 33/3016; A63H 33/3027; A63H 3/28; A63H 5/00; A63H 2200/00; G06V 40/174

USPC ......... 446/81, 141, 142, 143, 219, 297, 299, 446/404, 408, 484
See application file for complete search history.

(56) References Cited

U.S. PATENT DOCUMENTS

| | | | | |
|---|---|---|---|---|
| 4,202,607 | A * | 5/1980 | Washizuka ............. | G04G 17/08 349/58 |
| 6,400,996 | B1 * | 6/2002 | Hoffberg ............... | G06F 3/0482 700/86 |
| 6,527,610 | B1 * | 3/2003 | Hornsby ............... | G04G 9/0064 446/175 |
| 6,687,675 | B1 * | 2/2004 | Archambeau ........... | G09F 27/00 704/258 |
| 6,850,252 | B1 * | 2/2005 | Hoffberg ............... | H04N 21/475 380/252 |
| 7,146,184 | B1 * | 12/2006 | Tsitsiashvili ........... | A45C 15/04 455/66.1 |
| 7,194,289 | B1 * | 3/2007 | Flores, Jr. ............... | H04M 1/21 455/90.3 |
| 7,373,110 | B1 * | 5/2008 | McClain ................. | H04L 67/06 455/66.1 |

(Continued)

*Primary Examiner* — Joseph B Baldori
(74) *Attorney, Agent, or Firm* — Camille A. Wilson; Wilson Dutra, PLLC

(57) ABSTRACT

The present disclosure provides a more adapt and accessible messaging system. In some aspects, the present disclosure relates to a messaging system that allows users to prerecord messages for future or real time use. Allowing users to communicate emotional messages, both visually and audially to relay feedback to both users. In some embodiments, the system may be useful to help with mental issues, self-esteem problems and other personal issues, non-limiting examples. In some implementations, the device may provide instant messages from one message device to another message device.

18 Claims, 21 Drawing Sheets

(56) References Cited

U.S. PATENT DOCUMENTS

| | | | |
|---|---|---|---|
| 7,764,311 B2* | 7/2010 | Bill | G11B 27/105 |
| | | | 348/222.1 |
| 8,548,434 B2* | 10/2013 | Raffle | H04M 1/72412 |
| | | | 455/414.1 |
| 8,787,543 B2* | 7/2014 | Peregrin Emparanza | ............... |
| | | | H04M 1/6033 |
| | | | 455/461 |
| 8,847,884 B2* | 9/2014 | Li | G06Q 30/0631 |
| | | | 345/204 |
| 8,909,370 B2* | 12/2014 | Stiehl | B25J 9/1671 |
| | | | 700/264 |
| 9,089,781 B1* | 7/2015 | Bush | A63H 33/006 |
| 9,123,270 B1* | 9/2015 | Marcus | G09F 23/00 |
| 9,460,688 B2* | 10/2016 | Kosann | G06F 3/147 |
| 9,634,855 B2* | 4/2017 | Poltorak | G10L 13/00 |
| 9,814,993 B2* | 11/2017 | Ponomarev | A63H 3/28 |
| 10,379,719 B2* | 8/2019 | Scapel | G06V 40/176 |
| 2005/0031403 A1* | 2/2005 | Pohmajevich | B43K 23/002 |
| | | | 401/131 |
| 2007/0066247 A1* | 3/2007 | Mooney | H04M 1/21 |
| | | | 455/90.3 |
| 2008/0244940 A1* | 10/2008 | Mesika | G09F 13/12 |
| | | | 40/219 |
| 2015/0159856 A1* | 6/2015 | Adachi | F21V 33/0056 |
| | | | 362/135 |
| 2015/0222985 A1* | 8/2015 | Lin | H04R 1/44 |
| | | | 381/334 |
| 2017/0209796 A1* | 7/2017 | Kim | A63H 3/40 |
| 2019/0118104 A1* | 4/2019 | Su | G06F 3/0393 |
| 2019/0371028 A1* | 12/2019 | Harrises | G02B 27/0101 |
| 2019/0377755 A1* | 12/2019 | Chiang | G06V 40/171 |

* cited by examiner

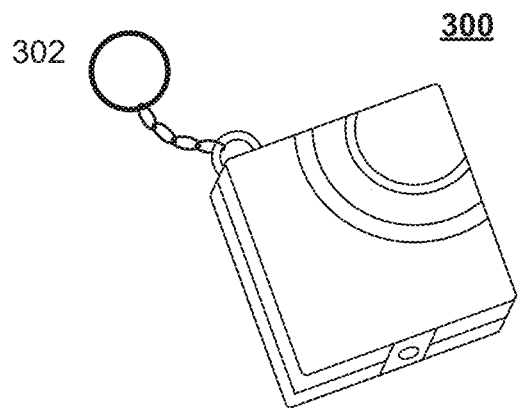
FIG. 3
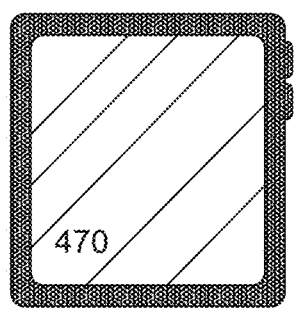 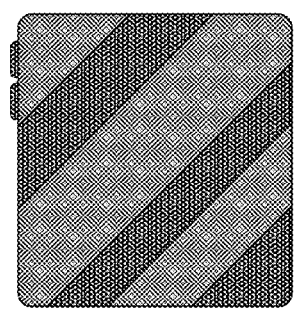
FIG. 4A    FIG. 4B

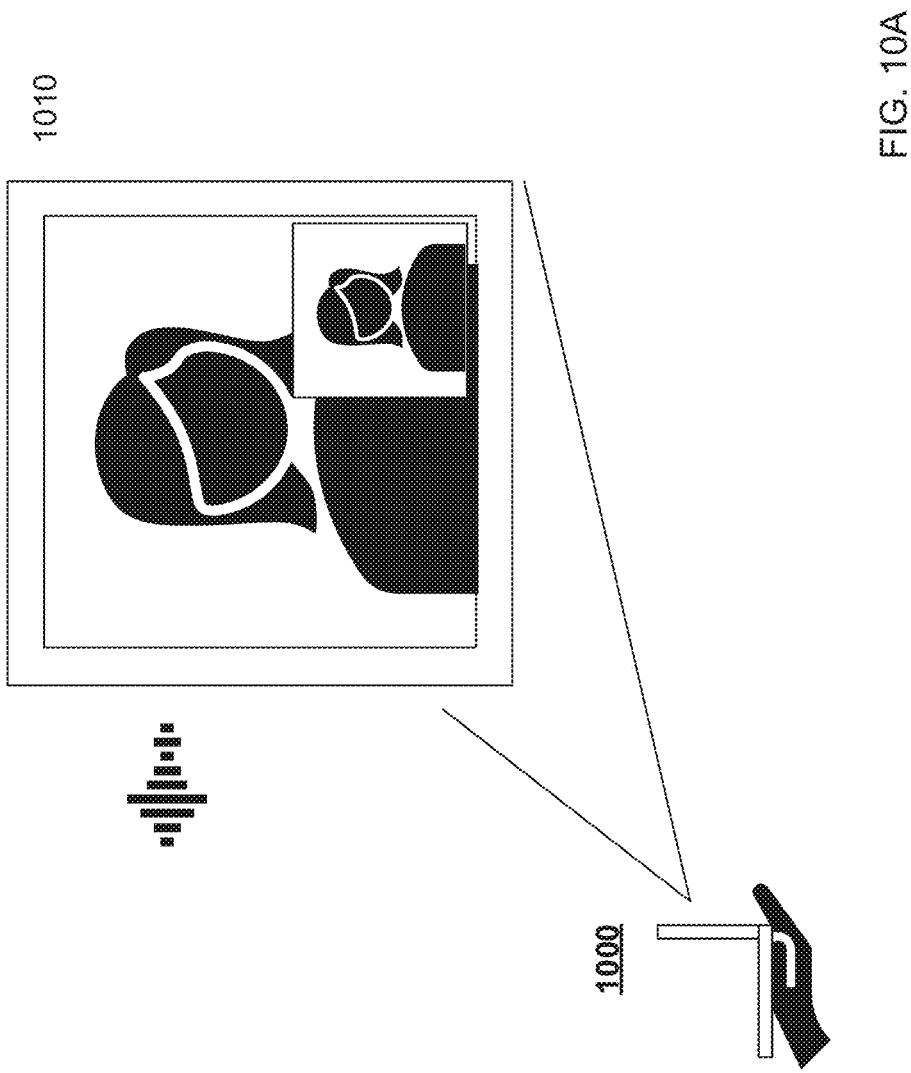

1440

1400

MESSAGE DELIVERY APPARATUS AND METHODS

CROSS-REFERENCE TO RELATED APPLICATION

This application claims priority to and the full benefit of U.S. Provisional Patent Application Ser. No. 62/944,993 filed Dec. 6, 2019, and titled "MESSAGE DELIVERY APPARATUS AND METHODS", the entire contents of which are incorporated in this application by reference.

BACKGROUND

Self-esteem refers to the positive and negative evaluations of one's self. Philosopher, David Hume, coined the concept in the eighteenth century when he discussed the importance of thinking positively about one's self; this positivity serves as motivation to do better and reach one's full potential. In 1892, William James explored the self, creating several categories including the "social self," which many believe translates closely to the modern version of self-esteem. James' social self is comprised of the characteristics that others generally recognize about someone (e.g., personality traits, looks, and more). In the late 1900's, sociologist, Morris Rosenberg, defined self-esteem as one's self-worth and developed the Rosenberg self-esteem scale, which is still widely used today. Modern psychology places great importance on having a healthy self-esteem.

Extremely low self-esteem may result in a feeling of worthlessness, self-hate, or even self-destruction, which may manifest in the form of causing physical harm to one's self. In contrast, extremely high levels of self-esteem may result in overconfidence and may even cause that person to overestimate their abilities, which could result in harm to them or others. Healthy levels of self-esteem are not only recommended by psychologists and medical professionals alike, but may also be crucial in maintaining healthy relationships, being able to socialize, and accepting criticism in acceptable ways. In other words, unhealthy self-esteem may cause the individual to be ostracized in some way, which could add to the self-esteem issue.

One recurring area of focus for improving self-esteem according to professional is self-empowerment. A variety of exercises exist to build up a person's image and self-confidence, such as creating a self-esteem collage or creating and repeating affirmations to reinforce someone's self-worth or set goals. An extension of this idea is having a person stand in front of a mirror, look at themselves, and repeat affirmations when needed, such as a way to set expectations in the morning or before major meetings. This variety of exercises can build self-confidence, remind someone of their goals or resolutions, and prepare them for the day or meeting to come.

One issue with this powerful exercise is that people (particularly those with existing self-esteem issues) may not have the courage or will to get out of bed, stand in front of the bathroom mirror, risking potential nosy ears, and say affirmations to themselves. Even those that do may not like the sound of their own voice or may not feel that their affirmations mean anything.

SUMMARY OF THE DISCLOSURE

What is needed is a device that allows one with self-esteem to complete the mirror affirmation exercises, but allows them to listen to pre-recorded messages from others (such as a coach, parent, family member, friend, or even themselves at a time when they did believe what they were saying).

What is needed is a device or apparatus that enables a user to work on self-improvement exercises on the go. In some embodiments, the device may integrate a mirror for the user to use for their exercises. In some implementations, the device may record a user's talk, speech, or affirmations to repeat at the user's convenience. In some aspects, the device may integrate with or connect to a system to collect and transmit messages or affirmations. In some embodiments, a third-party may record affirmations to set to the user. For example, a significant other may record affirmations to send to the user as they prepare to record their own. In some implementations, a user may create, alter, or delete recordings on the device or in a separate system. In some aspects, the device may be available in a variety of form factors depending on the use case.

The present disclosure relates to a message device comprising a self-view mechanism configured to portray a live self-view of a user; a storage mechanism configured to store a plurality of messages, each may comprise one or more audio, video, or image; a media playback device configured to play the plurality of messages; a communication mechanism configured to one or both receive and record messages; and a control mechanism that controls playback of the plurality of messages.

In some aspects, the message device may be configured to analyze audio received from the user, where an analysis of the audio identifies at least one mood of the user. In some embodiments, the message device may comprise a sensory cover. In some implementations, the message device may track usage of the media playback device. In some aspects, access to at least a portion of the plurality of messages may be remotely controllable. In some embodiments, the message device may comprise a compact. In some implementations, the message device may store a plurality of messages. In some aspects, the message device may organize the plurality of message based on message type. In some embodiments, the message device may comprise a microphone.

In some implementations, the message device self-view mechanism may comprise a mirror. In some aspects, the message device may comprise a plush toy, and where the self-view mechanism is located on an exterior of the plush. In some embodiments, the message device self-view mechanism may be configured for facial recognition. In some implementations, facial recognition may detect at least one mood of the user. In some aspects, suggested media may be based on a detected mood. In some implementations, described techniques may include hardware, a method or process, or computer software on a computer-accessible medium.

The present disclosure relates to a message device adapter connectable to at least one self-view mechanism, where the message device adapter may comprise a self-view mechanism configured to provide a live self-view of a user; a storage mechanism configured to store at least one message, where the at least one message may comprise audio; a media playback device configured to play the at least one message; a communication mechanism; a control mechanism. In some embodiments, the message device adapter may comprise an attachment mechanism configured to attach the message device adapter to the at least one self-view mechanism.

Implementations may include one or more of the following features. The at least one self-view mechanism may comprise mountable or free-standing reflective surface. The at least one self-view mechanism may comprise a mirror located in a vehicle. In some embodiments, the message device adapter may be configured to access and analyze the live self-view of the user, where analysis may comprise facial recognition. Implementations of the described techniques may include hardware, a method or process, or computer software on a computer-accessible medium.

The present disclosure relates to a system of message devices may comprise a plurality of message devices, where each of the plurality of message devices may comprise a self-view mechanism configured to provide a live self-view of a user; a communication mechanism configured to one or both receive and record messages, where the communication mechanism of each of the plurality of message devices allows for wireless communication between the plurality of message devices a storage mechanism configured to store a plurality of messages, each may comprise one or more audio, video, or images, where wireless communication between the plurality of message devices shares at least a portion of the plurality of messages; a media playback device configured to play the plurality of messages; and a control mechanism that controls playback of the plurality of messages.

In some embodiments, at least a portion of the plurality of message devices are remotely controllable. In some implementations, described techniques may include hardware, a method or process, or computer software on a computer-accessible medium.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 3 illustrates an exemplary message device with keychain connector, according to some embodiments of the present disclosure.

FIG. 4A illustrates an exemplary message device with touchscreen mirror, according to some embodiments of the present disclosure.

FIG. 4B illustrates an exemplary message device with touchscreen mirror, according to some embodiments of the present disclosure.

FIG. 10A illustrates an exemplary message device with video display on the self-view mechanism, according to some embodiments of the present disclosure.

DETAILED DESCRIPTION

The present disclosure provides generally for a message device that may allow someone to view messages, both audibly and visually. According to the present disclosure, the message device may be used to communicate messages between one user and another; whether it may be a doctor to a patient, a coach to a player, a lawyer to a client, non-limiting examples. The message device may transmit messages from one device to another using a LAN connection or Wi-Fi to upload the messages to specific devices.

In the following sections, detailed descriptions of examples and methods of the disclosure will be given. The description of both preferred and alternative examples though thorough are exemplary only, and it is understood that to those skilled in the art variations, modifications, and alterations may be apparent. It is therefore to be understood that the examples do not limit the broadness of the aspects of the underlying disclosure as defined by the claims.

Glossary

Self-View Mechanism: as used herein refers to a view that provides a live self-view of a user to the user, allowing a user to see themselves. In some aspects, a self-view mechanism may comprise a mirror or mirrored surface, such as where a message device comprises a compact or cosmetic case. In some embodiments, a self-view mechanism may be active, such as through a self-facing camera. In some implementations, a self-view mechanism may comprise a combination of passive and active elements. For example, in a passive state, the self-view mechanism may comprise a mirrored surface with an active screen behind it that may display a camera view.

Message Device: as used herein refers to a device that may provide messages to a user. In some aspects, a message device may comprise a separate device that may allow a user to hear messages as she looks at herself. For example, a message device may comprise a compact with a mirror and speaker. In some embodiments, a message device may be integrated with a smart phone or tablet. In some implementations, a message device may allow a user to watch himself and listen to positive messages, which may boost the user. For example, the message device may provide messages of empowerment, encouragement, or centering, depending on the needs of the user.

Message: as used herein refers to positive media messages, such as audio, video, text, or combinations thereof, as non-limiting examples. In some aspects, a message may comprise captured media from a familiar source, such as from a loved one, coach, self, teacher, or doctor, as non-limiting examples. In some embodiments, a message may comprise standard captured media, such as from a celebrity, generic actor, or fictional character. For example, a child may benefit from hearing messages from their favorite cartoon character.

Figure 1A:
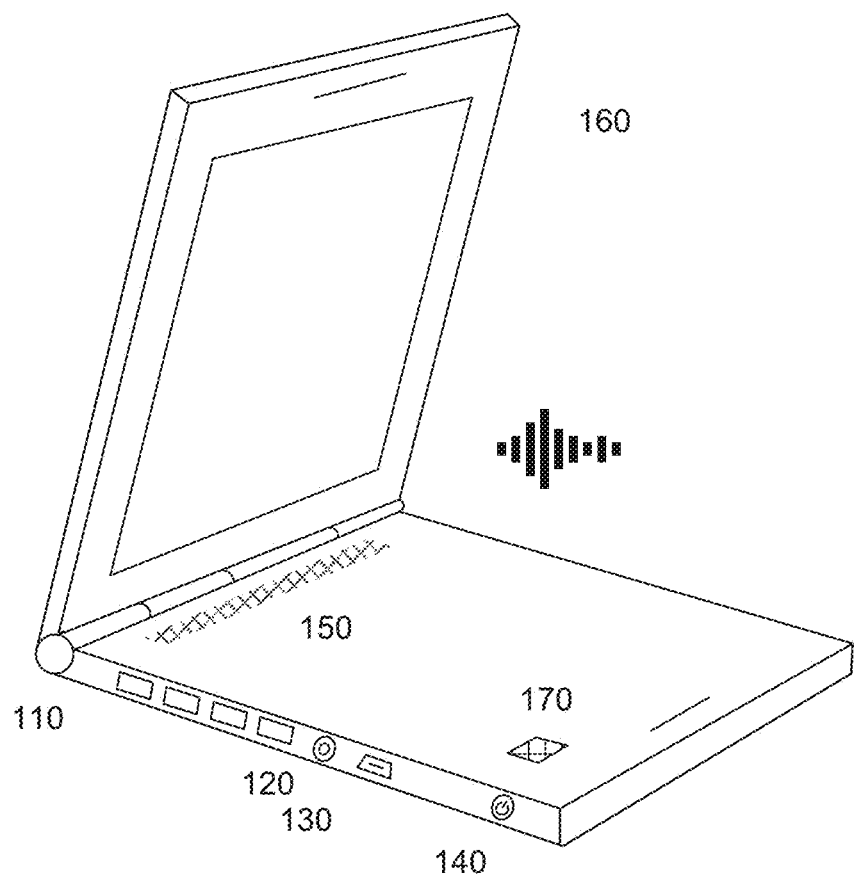
FIG. 1A illustrates an exemplary message device, according to some embodiments of the present disclosure.
Figure 1B:
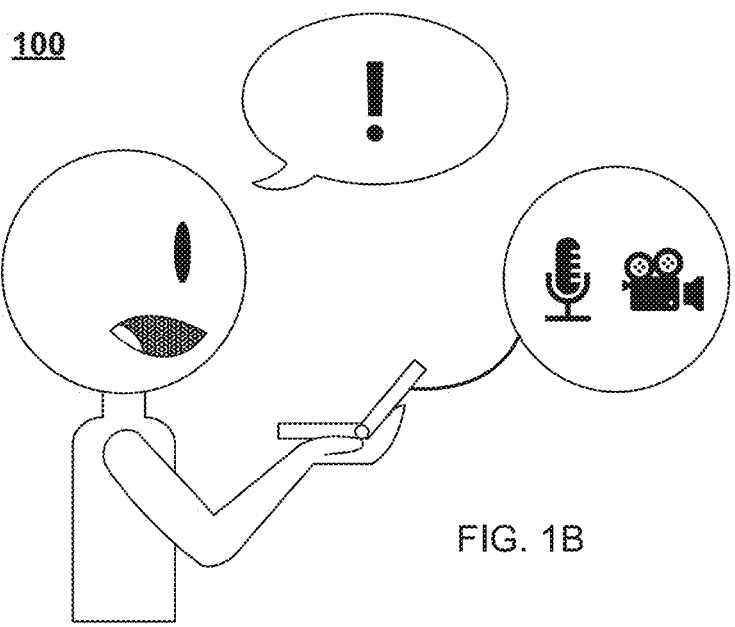
FIG. 1B illustrates an exemplary message device, according to some embodiments of the present disclosure.
Figure 1C:
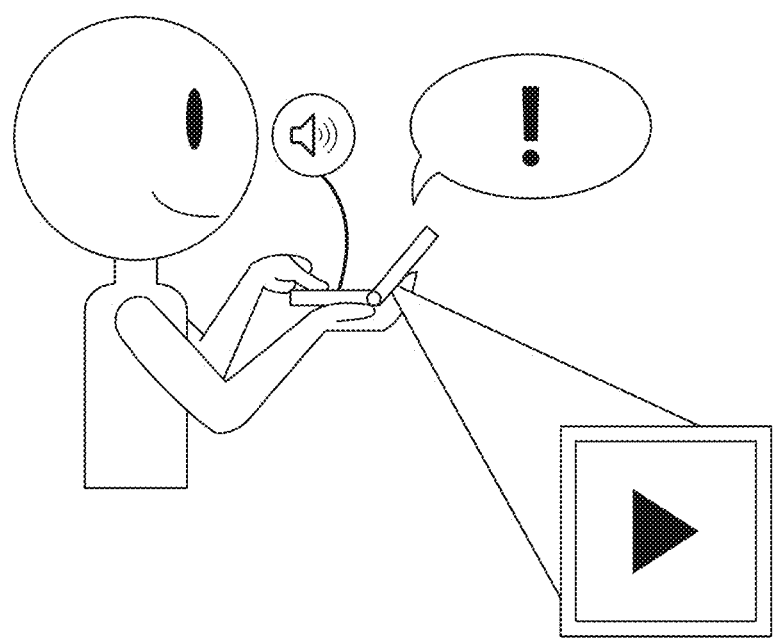
FIG. 1C illustrates an exemplary message device, according to some embodiments of the present disclosure.

Referring now to FIG. 1A, an exemplary message device 100 is illustrated. Referring now to FIG. 1B, an exemplary message device 100 is illustrated. Referring now to FIG. 1C, an exemplary message device 100 is illustrated. In some embodiments, a message device 100 may comprise a storage mechanism configured to store messages. A local storage mechanism may allow for access to messages even when wireless communication is not available.

In some embodiments, the message device 100 may play prerecorded messages. In some aspects, the message device 100 may comprise a self-view mechanism 160 that may allow a user to see themselves. In some embodiments, the self-view mechanism 160 may be passive, such as a mirror or other reflective surface. In some implementations, the self-view mechanism 160 may be active, such as through a camera.

In some aspects, a self-view mechanism 160 may be used to display a textual message across the screen while simultaneously being able to see a reflection of oneself. In some embodiments, a combination may allow a user to view the words and themselves while speaking the phrase or listening to the phrase. In some implementations, a text display may allow those who are hearing impaired to utilize the device as well. In some embodiments, the self-view mechanism 160 may have a built in self-facing camera to allow for video recordings as well. For example, a user may record a visual message communicating or demonstrating something to send to another user. In some aspects, the self-view mechanism 160 may have a picture in picture feature that may allow a user to view a video message at the same time as viewing themselves.

For example, a psychiatrist may prerecord a message on a separate message device 100 to a patient encouraging them to stay positive, and the patient may then play the message on their message device 100. In some aspects, the message may be textual so that the user may have the option to read it, or there may be a an audio message sent from one message device 100 to another and then played on the speaker 150 of a media playback device of the message device 100 as shown.

In some embodiments, the message device 100 may comprise a microphone 130 that may detect when a user is speaking. In some aspects, the message device 100 may detect tone, affect, and mood conveyed by the user's voice. This may allow for monitoring and tracking of use and effectiveness of messages. In some implementations, the message device 100 may activate the microphone 130 as a message is played, which may allow for confirmation that the user is properly reciting or responding to the message. In some embodiments, the message device 100 may play white noise that may allow the user to drown out ambient noises and distractions to focus on the recitation.

In some aspects, the user may have the ability to select a certain message based on preference using the message selections 110 buttons. For example, the messages may be time, date, or event specific, such as a Monday morning energy message, bedtime centering message, and pre-test empowerment message. In some implementations, a user may use the message selections 110 buttons to choose what messages to keep or delete if storage on the message device 100 may be low.

In some embodiments, a message device 100 may comprise a control mechanism that may allow for control of one or more of playback, access to messages, media capture, and the self-view mechanism. In some implementations, a user may use the local recording 120 button to begin a recording. The local recording 120 button may be used to stop and start recordings as the user pleases. In some aspects, the user may use the local recording 120 button to respond to another users' message directly after listening to or reading it, which may allow for communal empowerment and encouragement. In some embodiments, a microphone 130 may be used to record local audio.

In some embodiments, a charging port 170 may allow for recharging of the message device 100. In some aspects, the message device 100 may comprise a rechargeable power source, a replaceable power source, or a combination thereof. In some embodiments, the battery percentage may be displayed on the mirrored screen or the side of the message device 100. In some aspects, the power 140 button may be used to turn the message device 100 on and off at the users' request. In some implementations, the message device 100 may automatically power off after a predefined period of time to conserve battery power.

Figure 2A:
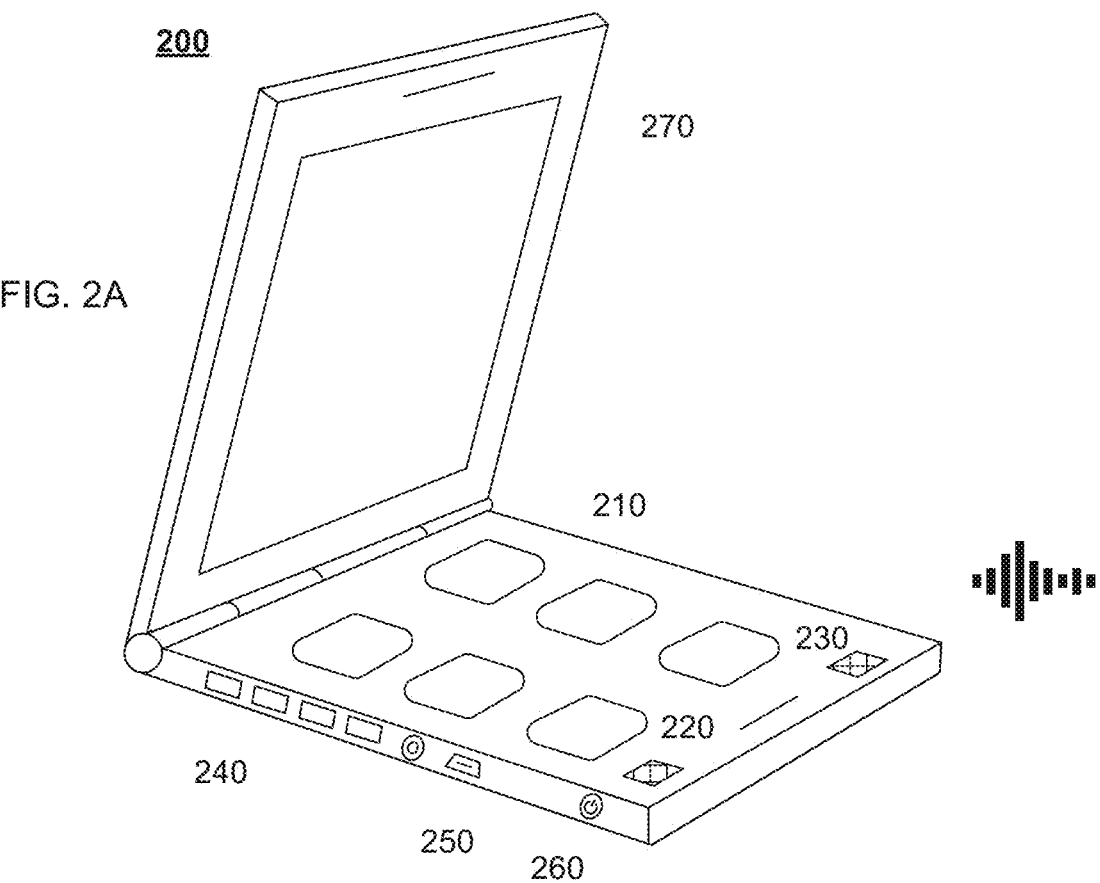
FIG. 2A illustrates an exemplary message device, according to some embodiments of the present disclosure.

Referring now to FIG. 2A, an exemplary message device 200 with a touch pad 210 is illustrated. The touch pad 210 may comprise icons for different message types, which may allow a user to easily select a message. In some embodiments, the message device 200 may display notifications for each message type on the touch pad 210. In some implementations, the message device 200 may display each notification via a notification tab at the top of the self-view mechanism 270 or the touch pad 210. In some embodiments, a message device 200 may comprise a manual power button 260. In some aspects, a message device 200 may be powered off after a predefined amount of inactive status.

In some implementations, receipt of a new message may trigger a notification, such as an audio alert, a visual alert, a tactile alert, or combinations thereof. For example, the touch pad 210 may comprise lighting, and a notification may cause the message type key to illuminate when the message device 200 is opened. In some embodiments, an initial notification may be tactile or audio, which may be easier to detect when the message device 200 is stored. In some aspects, a message device 200 may comprise a recording control button 220 that may record audio collected through a microphone 230. In some embodiments, audio may be played through a playback mechanism through a speaker 250.

In some aspects, the control buttons 240 may include, but are not limited to, volume control, Bluetooth sync, record/play button, etc. In some embodiments, the control buttons 240 may be used to control the message device 200 if the touch pad 210 malfunctions. For example, the touch pad 210 may malfunction if dropped too hard or misused, however, the buttons 240 may be used to control the navigation of the apps displayed on the touch pad 210.

Figure 2B:
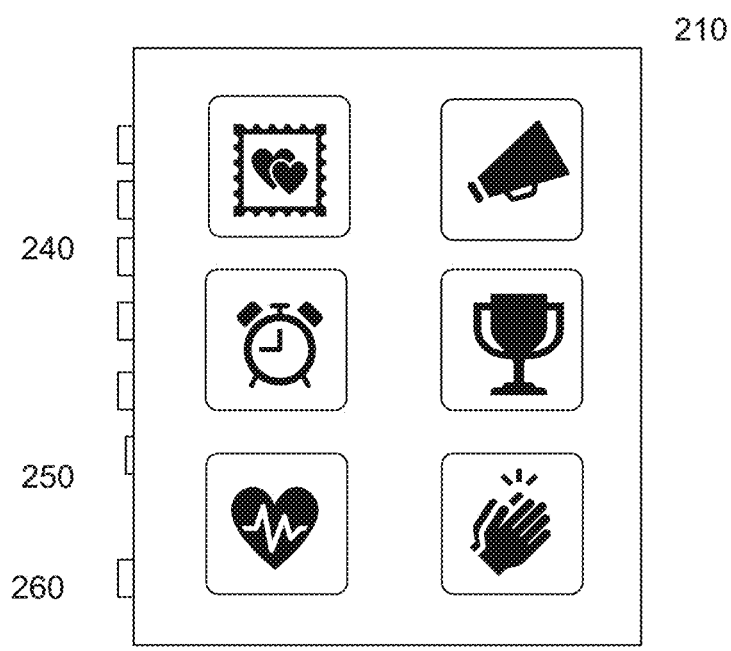
FIG. 2B illustrates an exemplary message device, according to some embodiments of the present disclosure.

Referring now to FIG. 2B, an exemplary base for a message device with touchpad 210 is illustrated. In some aspects, side buttons 240 may control a range of functions, such as volume, record, play, and synchronization, as non-limiting examples. In some embodiments, synchronization may periodically occur, which may keep the messages updated. In some implementations, synchronization may occur automatically when the message device is connected to a wi-fi network and may be synced manually when not connected.

In some aspects, the touchpad 210 may comprise set message types with icons to allow for quick access. As an illustrative example, the message types may comprise a message from a loved one, a wake-up message, a pep talk message, a congratulatory message, an empowerment message, and a calming message. A message from a loved one may allow someone personally known to the user to record a message. For example, a child's parent may travel or may be deployed overseas and hearing a message from that parent may comfort the child when they are separate. A calming message may assist a user when they feel anxious or overwhelmed. A wake-up message may energize a user in the morning.

Referring now to FIG. 3, an exemplary message device 300 with keychain connector 302 is illustrated. In some aspects, a keychain connector 302 may allow for convenient access to the message device 300. For example, a user may attach the message device 300 to their keys, which may allow the user to carry the message device 300 with them as they travel. As another example, a user may be a teenager who carries a bag or backpack. The keychain connector 302 may attach to the bag. In some embodiments, the message device 300 may be aesthetically geared toward a particular user type. For example, the message device 300 may comprise illustrations or characters popular with teenagers, children, or fandom members.

Referring now to FIG. 4A, an exemplary message device 400 with touchscreen self-view mechanism 470 is illustrated. Referring now to FIG. 4B, an exemplary message device 400 is illustrated. In some embodiments, an aesthetic of a message device 400 may comprise a sleek and modern look, which may be preferable to some users. For example, men may not typically carry a compact, so a message device 400 may address their needs and preferences. In some implementations, a touchscreen self-view mechanism 470 may be a more natural interaction and accessory for some users.

In some aspects, a touchscreen self-view mechanism 470 may allow for direct input of message selection, recording, and settings management. In some embodiments, a touchscreen self-view mechanism 470 may dim reflectivity when operating and controlling the message device 400 and may activate reflectivity during use and recitation of messages. In some aspects, a message device 400 may comprise multiple self-view mechanisms 470, which may be a combination of passive and active.

Figure 5:
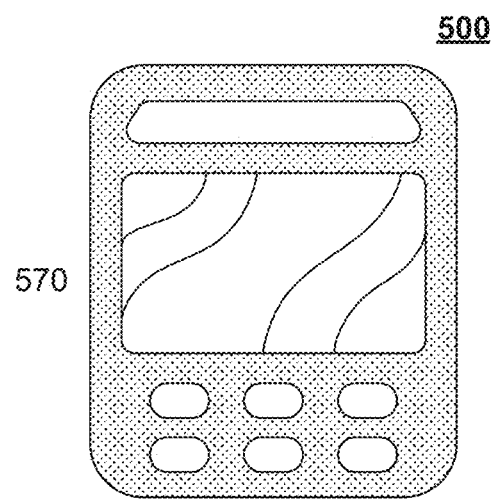
FIG. 5 illustrates an exemplary message device, according to some embodiments of the present disclosure.

Referring now to FIG. 5, an exemplary message device 500 is illustrated. In some embodiments, a message device 500 may be tailored to a user who may need or prefer a durable device. For example, a child may prefer a durable message device 500 that may mimic other electronic toys, such as child tablets, child computers, or child replications of adult devices. In some implementations, a message device 500 may comprise a handle, which may allow the user to carry the message device 500. In some aspects, the message device 500 may comprise a durable self-view mechanism 570 to parallel the durability of the message device 500. For example, the self-view mechanism 570 may comprise a plastic.

In some implementations, a message device 500 may comprise large buttons that may be easy to press. In some embodiments, the large buttons may comprise easy to understand content, such as colors, illustrations, icons, or emojis. In some implementations, this may allow a user to understand the different options without requiring the ability to read. In some aspects, a combination of illustration and text may allow users who know different languages to interact with the message device 500 without requiring comprehension of a particular language.

Figure 6:
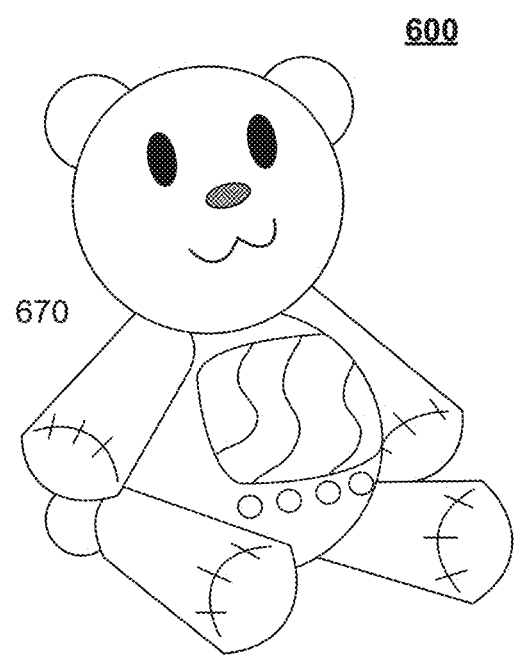
FIG. 6 illustrates a stuffed animal with an exemplary message device, according to some embodiments of the present disclosure.

Referring now to FIG. 6, a stuffed animal with an exemplary message device 600 is illustrated. In some embodiments, a message device 600 may provide comfort and confidence to a user. In some implementations, users may prefer different types of comfort, and a stuffed animal or other soft toy may provide that comfort. In some aspects, this preference may be true for a user of any age, and particularly for children. Where the message device 600 comprises a soft or plush surrounding, the self-view mechanism 670 may be flexible, such as through a flexible plastic, a reflective paint, or a reflective sticker placed over a flexible material. In some embodiments, the message device 600 may be disassembled, which may allow for cleaning of the stuffed animal without affecting the integrity of any electronics or self-view mechanism 670. In some aspects, the stuffed animal may be switched with other options, which may allow for variety and adaptability of the message device 600 with other soft and plush toys.

Figure 7:
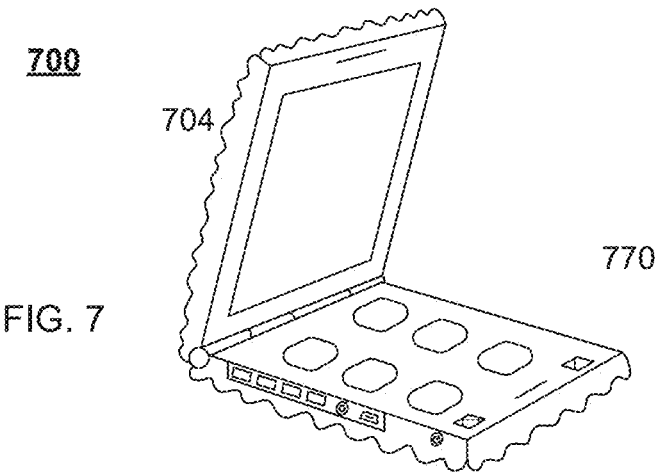
FIG. 7 illustrates an exemplary message device with sensory cover, according to some embodiments of the present disclosure.

Referring now to FIG. 7, an exemplary message device 700 with sensory cover 704 is illustrated. In some aspects, a sensory cover 704 may comprise a textured surface, which may provide an additional layer of comfort and confidence. In some embodiments, a textured surface may reduce anxiety associated with holding a cold, rigid message device 700. In some implementations, this may be particularly helpful during recitation of messages, which may already cause a level of anxiety. In some aspects, the textured surface may comprise one or more a fabric, silicone, rubber, or other material that may provide tactile comfort when gripped. In some embodiments, a variety of textures may be preferable depending on how a user is feeling, such as for different moods, different anxiety levels, or different times during the day.

Figure 8:
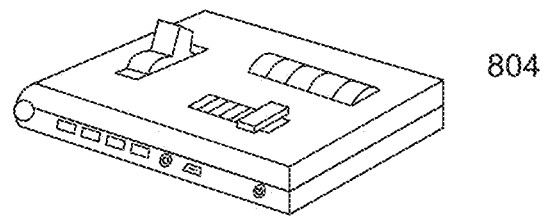
FIG. 8 illustrates an exemplary message device with sensory cover, according to some embodiments of the present disclosure.

Referring now to FIG. 8, an exemplary message device 800 with sensory cover 804 is illustrated. In some aspects, a sensory cover 804 may comprise one or more fidget mechanisms, which may allow a user to physically engage with the fidget mechanisms when holding the message device 800. In some embodiments, a sensory cover 804 may allow a user to focus on the recitation by physically occupying their body. In some implementations, fidget mechanisms may comprise zippers, spinners, or squeezable material, as non-limiting examples.

Figure 9:
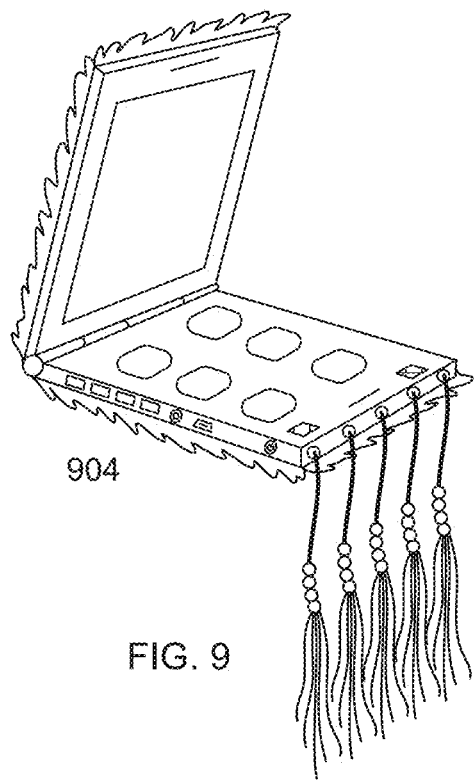
FIG. 9 illustrates an exemplary message device with sensory cover, according to some embodiments of the present disclosure.

Referring now to FIG. 9, an exemplary message device 900 with sensory cover 904 is illustrated. In some aspects, a sensory cover 904 may comprise a soft exterior, such as a fabric, fur, or plush, as non-limiting examples. In some embodiments, a sensory cover 904 may be removable, such as to allow for cleaning or replacement. In some implementations, a removable sensory cover 904 may allow a user to customize and personalize their message device 900. In some aspects, a sensory cover 904 may comprise tassels or other flairs, which may make the message device 900 feel more personal to the user.

Referring now to FIG. 10A, an exemplary message device 1000 with video display on the self-view mechanism 1070 is illustrated. In some embodiments, a message device 1000 may allow for double images on the self-view mechanism 1010. In some implementations, this may allow for video messages. In some aspects, a video message may comprise a message from a person, such as themselves, a loved one, a coach, a celebrity, a message provider, a therapist, a doctor, or a teacher, as non-limiting examples. In some embodiments, a video message may be animated, such as for a child. In some implementations, the animation may comprise a video message from a popular movie or television show character, an animal (such as an elephant, penguin, or puppy), or a toy (such as a teddy bear, a train, or dolls). In some aspects, the video message may display simultaneously with the self-image. For example, the user may have a larger image of the other user on the screen; overlapped by a smaller image of themselves displayed on the self-view mechanism 1010.

In some implementations, the video message on the self-view mechanism 1010 may be used to view an image the user recorded for themselves. For example, the user may record a video message for a specific date later in time and save it to the message device, then the user may view it on the specific date or time they recorded it for. In some aspects, a user may be directed to record a video message by a coach or therapist, as watching herself speak a message may be more powerful than simply hearing it or watching someone else say it. For example, the message may be "I am smart. I am strong. I am capable. I am me and that is fantastic!" A user may be more likely to believe the statement if he watches himself say it while repeating the words.

In some aspects, messages may be communal, and messages from other users may be shared. In some embodiments, message sets or packages may be available. For example, a personal coach may have recorded a series of empowerment video messages that are intended for use in chronological order, as each video message may build on the previous one. In some embodiments, the user may pause and play the video at any time and as many times as they would like.

In some implementations, the message device 1000 may comprise a compact mechanism. For example, the message device may be folded up to fit into a small compartment in a purse, makeup bag, or backpack. In some aspects, the message device 1000 may comprise a makeup case, a mirror set, or other typical compact device.

Figure 10B:
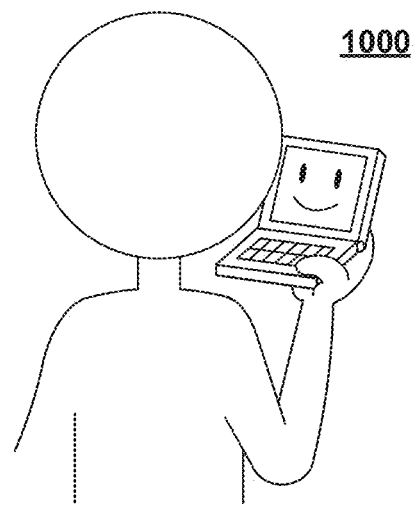
FIG. 10B illustrates an exemplary message device with video display on the self-view mechanism, according to some embodiments of the present disclosure.
Figure 10C:
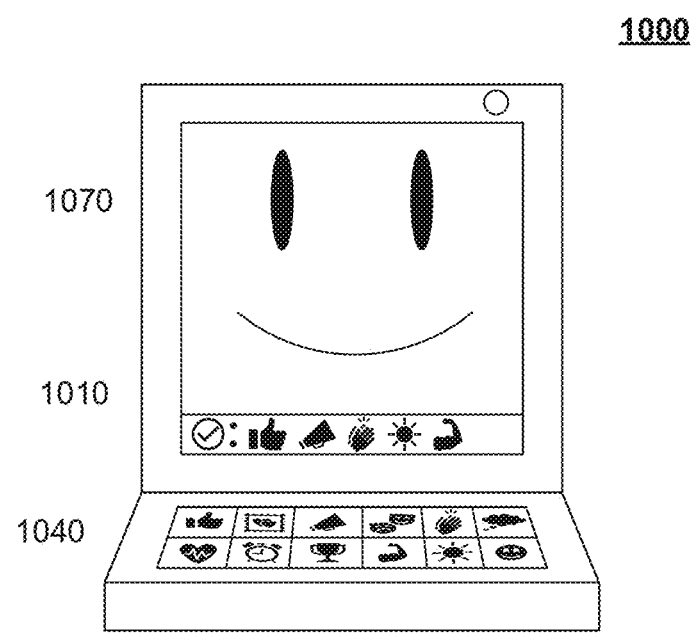
FIG. 10C illustrates an exemplary message device with video display on the self-view mechanism, according to some embodiments of the present disclosure.

Referring now to FIG. 10B, an exemplary message device 1000 with video display on the self-view mechanism 1070 is illustrated. Referring now to FIG. 10C, an exemplary message device 1000 with video display on the self-view mechanism 1070 is illustrated. In some embodiments, a self-view mechanism 1070 may comprise facial recognition that may allow for analysis of user's state, which may determine a mood of a user. For example, the self-view mechanism 1070 may identify that the user is showing visual cues of happiness. In some implementations, the message device 1000 may suggest a set of message selections 1010 that are specific to the user's mood. In some aspects, a user may be able to select and control that playback through controls 1040.

Figure 10D:
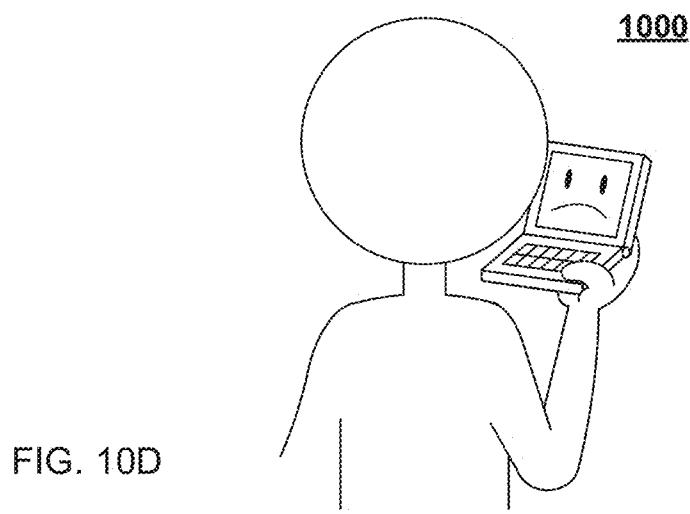
FIG. 10D illustrates an exemplary message device with video display on the self-view mechanism, according to some embodiments of the present disclosure.
Figure 10E:
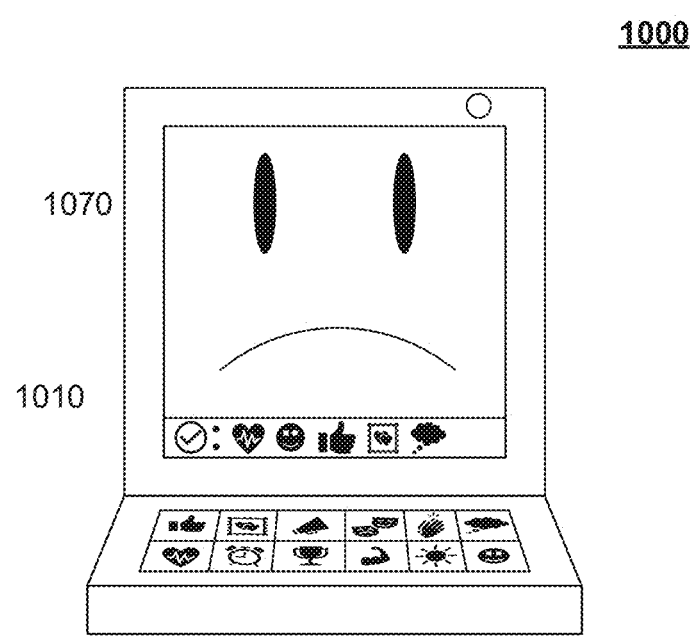
FIG. 10E illustrates an exemplary message device with video display on the self-view mechanism, according to some embodiments of the present disclosure.

Referring now to FIG. 10D, an exemplary message device 1000 with video display on the self-view mechanism 1070 is illustrated. Referring now to FIG. 10E, an exemplary message device 1000 with video display on the self-view mechanism 1000 is illustrated. For example, the self-view mechanism 1070 may identify that the user is showing visual cues of sadness or anxiety. In some implementations, the message device 1000 may suggest a set of message selections 1010 that are specific to the user's mood. In some aspects, a user may be able to select and control that playback through controls 1040.

Figure 11:
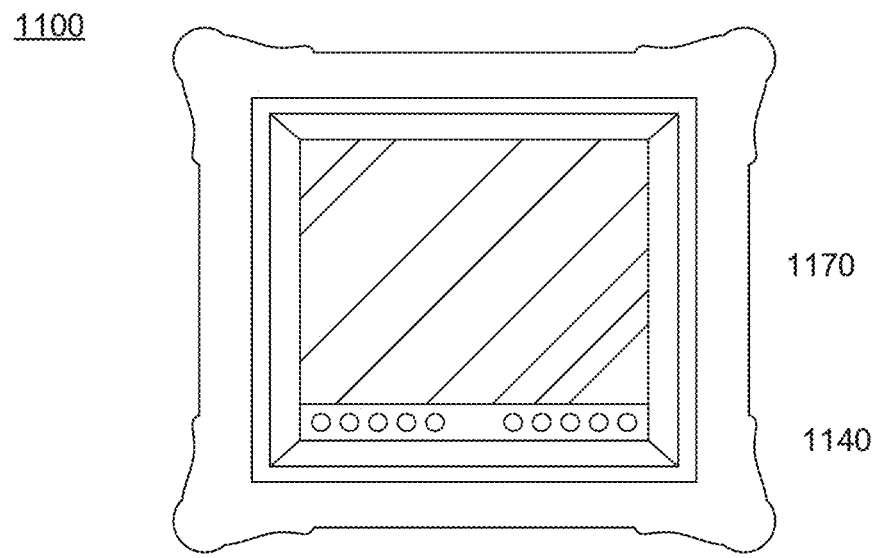
FIG. 11 illustrates an exemplary message device with mountable self-view mechanism, according to some embodiments of the present disclosure.

Referring now to FIG. 11, an exemplary message device 1100 with mountable self-view mechanism 1170 is illustrated. In some embodiments, a message device 1100 may comprise a static self-view mechanism 1170, such as may be mounted on a wall. In some aspects, control mechanism 1140 may be located at the base of the self-view mechanism 1170, which may allow for access for a range of heights and reaches. In some embodiments, a mountable self-view mechanism 1170 may allow for a user to listen to, record, and recite messages from a static position. For example, the mountable self-view mechanism 1170 may located in a bathroom used every morning or in a hall passed before leaving the apartment each day.

Figure 12:
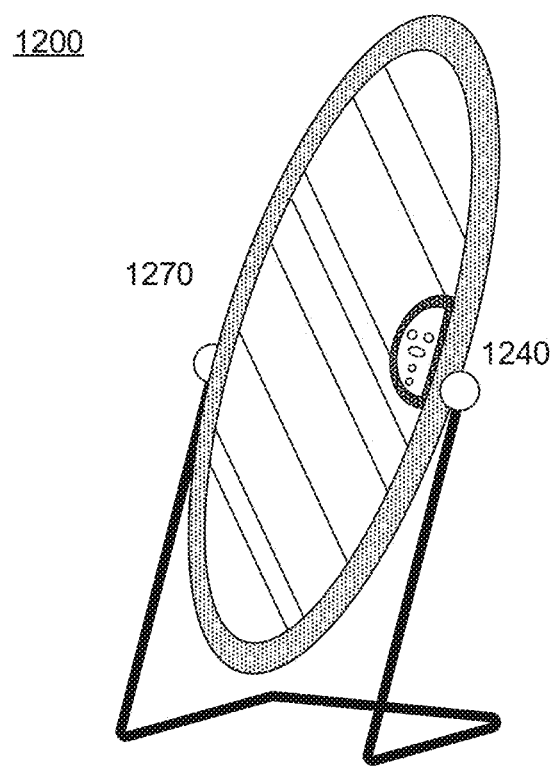
FIG. 12 illustrates an exemplary message device with free-standing self-view mechanism, according to some embodiments of the present disclosure.

Referring now to FIG. 12, an exemplary message device 1270 with free-standing self-view mechanism 1200 is illustrated. In some embodiments, a message device 1200 may comprise a static self-view mechanism 1270, such as may be placed on the floor, a countertop, or table, as non-limiting examples. In some aspects, a control mechanism 1240 may be located on the self-view mechanism 1200. In some aspects, a free-standing self-view mechanism 1200 may allow for view of a user's entire body, which may be useful for some recitations. For recitations related to body image, full view may make recitations of messages more difficult at first but also more impactful.

Figure 13A:
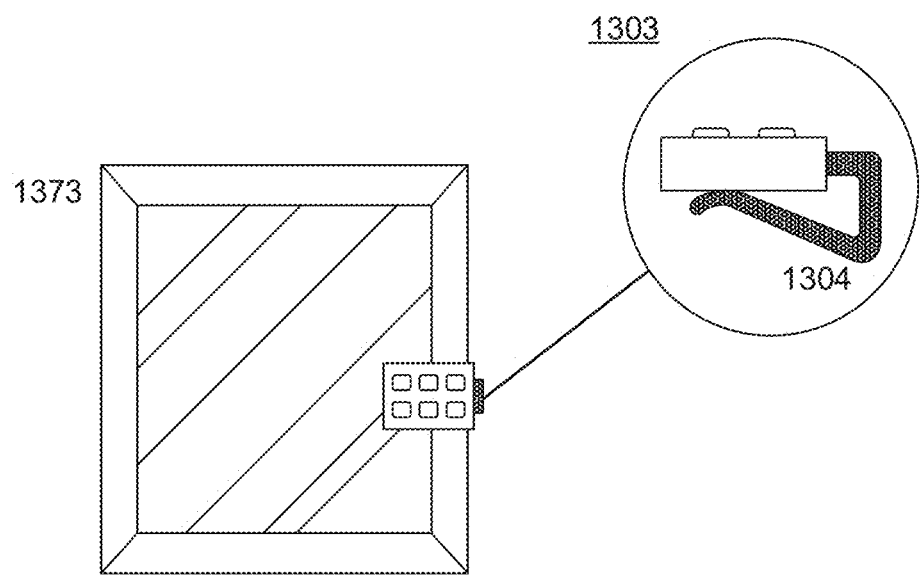
FIG. 13A illustrates an exemplary message device adapter on a mountable self-view mechanism, according to some embodiments of the present disclosure.

Referring now to FIG. 13A, an exemplary message device adapter 1300 on a mountable self-view mechanism 1370. In some embodiments, a message device adapter 1300 may comprise a clip attachment mechanism 1302. In some implementations, a message device adapter 1300 may be portable and removable, which may allow a user to convert self-view mechanisms into message devices. In some aspects, a message device adapter 1303 may comprise a clip attachment mechanism 1304 that may be attached to a variety of surfaces.

Figure 13B:
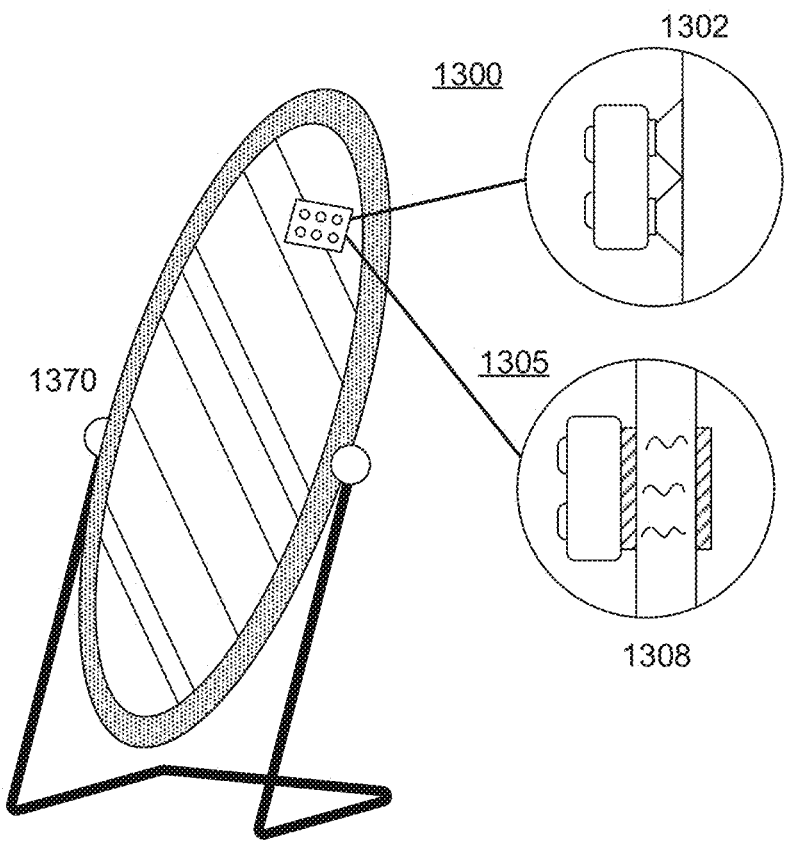
FIG. 13B illustrates an exemplary message device adapter on a free-standing self-view mechanism, according to some embodiments of the present disclosure.

Referring now to FIG. 13B, an exemplary message device adapter 1300 on a free-standing self-view mechanism 1371. In some embodiments, a message device adapter 1300 may comprise a suction attachment mechanism 1302. In some aspects, a message device adapter 1305 may comprise a magnetic attachment mechanism 1308. In some implementations, the preferred attachment mechanism 1303, 1302, 1308 may depend on the surface for attachment.

Figure 14A:
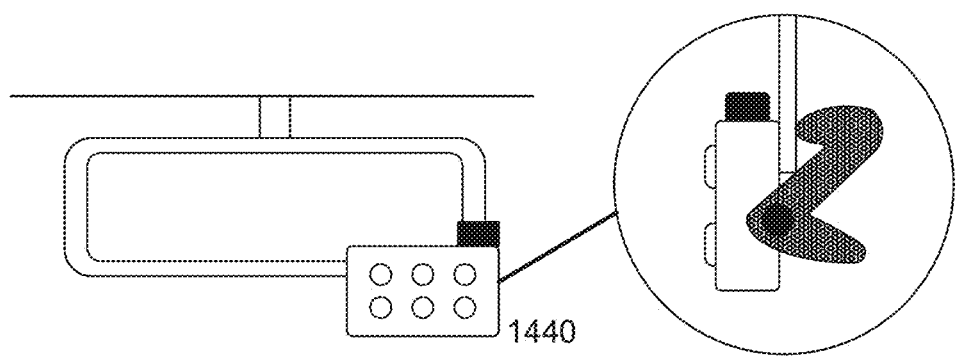
FIG. 14A illustrates an exemplary message device adapter on a vehicle self-view mechanism, according to some embodiments of the present disclosure.
Figure 14A:
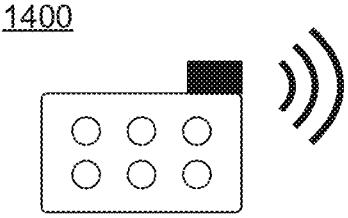
Figure 14B:
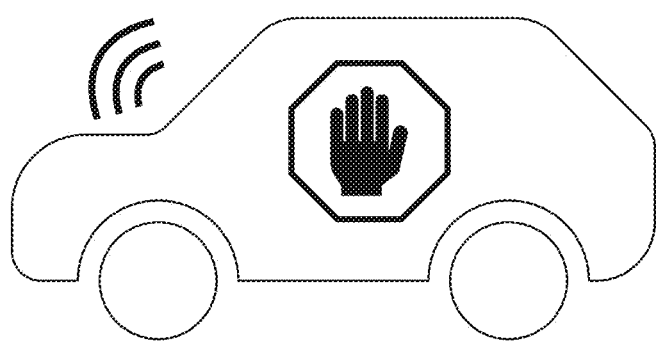
FIG. 14B illustrates an exemplary message device adapter on a vehicle self-view mechanism, according to some embodiments of the present disclosure.

Referring now to FIG. 14A, an exemplary message device adapter 1400 on a vehicle self-view mechanism 1470 is illustrated. In some embodiments, controls 1440 may face a driver in the vehicle 1472. Referring now to FIG. 14B, an exemplary message device adapter 1400 communicating with a vehicle 1472 is illustrated. In some aspects, a message device adapter 1400 may detect whether the vehicle 1472 is in motion. When in motion, the message device adapter 1400 may be deactivated, which may limit the ability of a user to interact with the message device adapter 1400 while driving.

Figure 15:
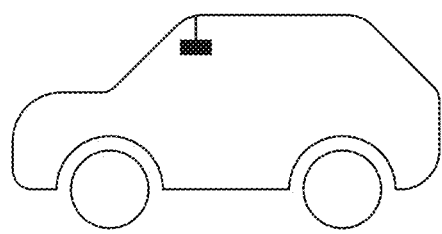
FIG. 15 illustrates an exemplary system of message devices, wherein the message devices may communicate wirelessly, according to some embodiments of the present disclosure.
Figure 15:
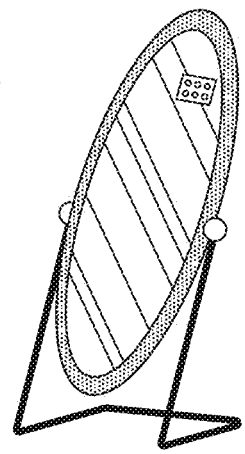
Figure 15:
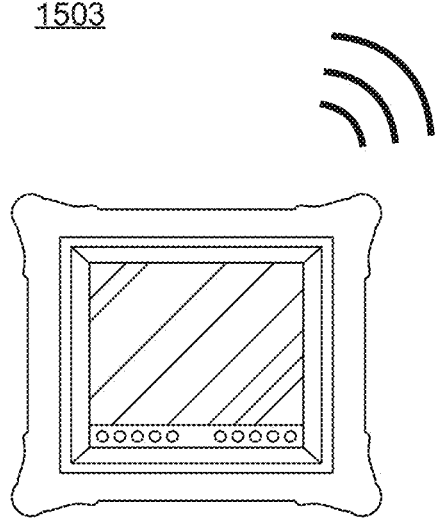
Figure 15:
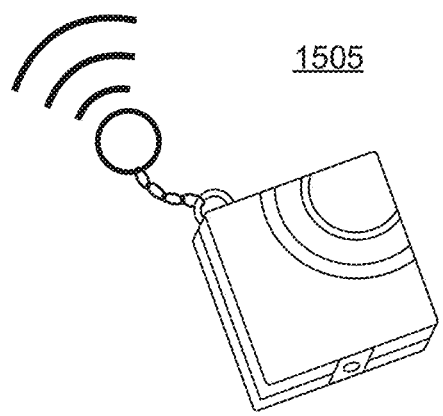

Referring now to FIG. 15, an exemplary system of message devices 1500, 1501, 1503, 1505 is illustrated, wherein the message devices 1500, 1501, 1503, 1505 may communicate wirelessly. In some aspects, the system may comprise multiple types of message devices 1500, 1501, 1503, 1505, such as a mountable message device 1503, message device adapters 1500, 1502, and a handheld message device 1505. In some embodiments, the message devices 1500, 1501, 1503, 1505 may comprise a wireless communication mechanism that may allow for wireless communication within the system.

In some implementations, a system of message devices 1500, 1501, 1503, 1505 may allow for shared messages and tracking. For example, in preparation for their day, a user may recite a message to a message device adapter 1500 at home and then repeat that exercise to a message device adapter 1501 in the car. Throughout the day, a user may periodically revisit the recitations on a handheld message device 1505 that they carry on their bag. Then, at the end of the day with a mountable message device 1503 in their bathroom, they may do a final recitation before bed. In some implementations, the messages used, heard, and spoken may be tracked as a system, which may allow for a more accurate understand of how a user is using and responding to messages and message devices 1500, 1501, 1503, 1505.

Figure 16:
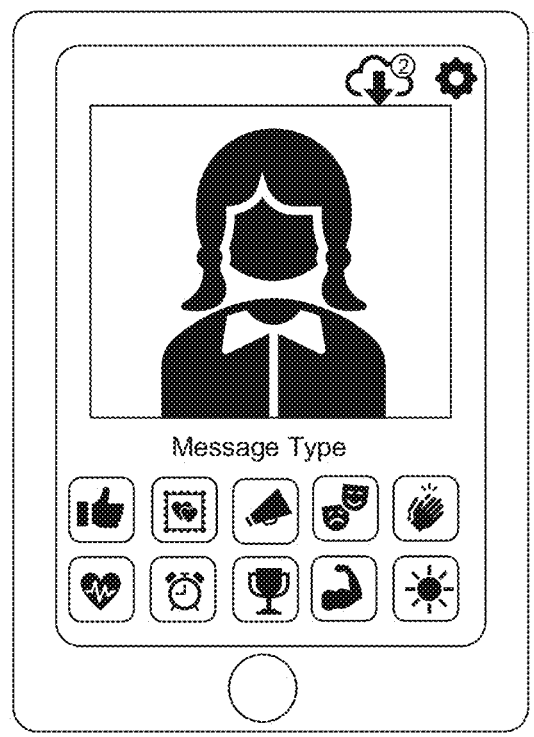
FIG. 16 illustrates an exemplary message device, according to some embodiments of the present disclosure.

Referring now to FIG. 16, an exemplary interface on a message device 1600 is illustrated. In some aspects, a message device 1600 may comprise a commonly used smart device, such as a smartphone or tablet. For example, the message device 1600 may comprise an iPad, a self-view mechanism may comprise a display with forward-facing camera, and icons may allow for message selection.

In some embodiments, the message device 1600 may have a distinct number of message icons 1610 displayed on the screen. In some aspects, the screen may be touch sensitive; either with some variation of stylist or by finger touch by the user. For example, the user may use the message device 1600 like a smart phone and navigate each icon 1610 by touch and tap of finger.

In some embodiments, a message device 1600 may have a home button that when pressed takes the user back to the home screen from whichever icon 1610 they were previously on. For example, if the user was on the empowerment icon 1610 they may press the home button to return to the home screen that may encompass all icons 1610 together.

In some aspects, a message device 1600 may have a notification tab displayed at the top of the screen that may be pulled down to view all updates, messages, settings, as non-limiting examples. For example, the message device 1600 may have a system update, and the user may then pull down the notification tab, tap on the system update and the message device 1600 may automatically update itself.

In some embodiments, the message device 1600 may have a self-view display system shown in sync with the icons 1610 on the screen. In some implementations, the self-view system may be switched off when not playing a message and may automatically be activated when the user selects a video message to view. In some aspects, some message types may be beneficial for certain situations, such as to calm anxieties, to handle a failure, to prepare for a test or meeting, to handle a crisis of confidence, or to help someone missing a loved one.

In some implementations, the message device 1600 may track usage and collect data, which may be shared with parents, coaches, doctors, or therapists, as non-limiting examples. Tracking data may provide insight in the effectiveness of the messages and the message strategy. For example, the user may be an anxiety patient, and the doctor may benefit from knowing how often she selects the anti-anxiety message type, with the hope that the number lessens over time. As another example, the user may be a child who refuses to engage, and a parent may want to know how often the child uses the message device 1600, with the hope that the child increasingly uses the message device 1600.

Figure 17:
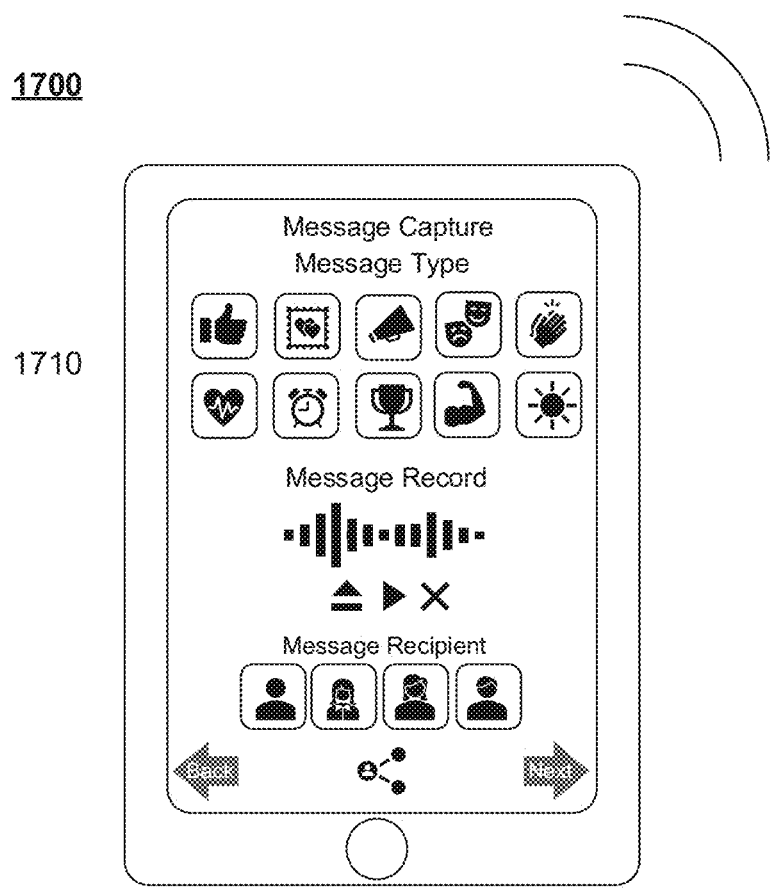
FIG. 17 illustrates an exemplary message device, according to some embodiments of the present disclosure.

Referring now to FIG. 17, an exemplary message capture interface of a message device 1700 is illustrated. In some aspects, a person may record, capture, and transmit messages to themselves and other users. In some embodiments, a person may select a message type to record by icon 1710. Once recorded, the person may select the message recipient or recipient group, such as themselves, a loved one, a patient, a client, a following, subscribers, a team, or a class, as non-limiting examples.

In some embodiments, the message device 1700 may have specific icons 1710 for different message types. For example, a teacher may tap an "encouragement" icon and send that in real time to a student before taking a test or while doing their homework. In some aspects, the message device 1700 may allow a user to record a voice message and immediately send it to another user for encouragement or positive feedback. For example, a coach may send a real time voice message to a player before a game providing advice or encouragement.

Figure 18:
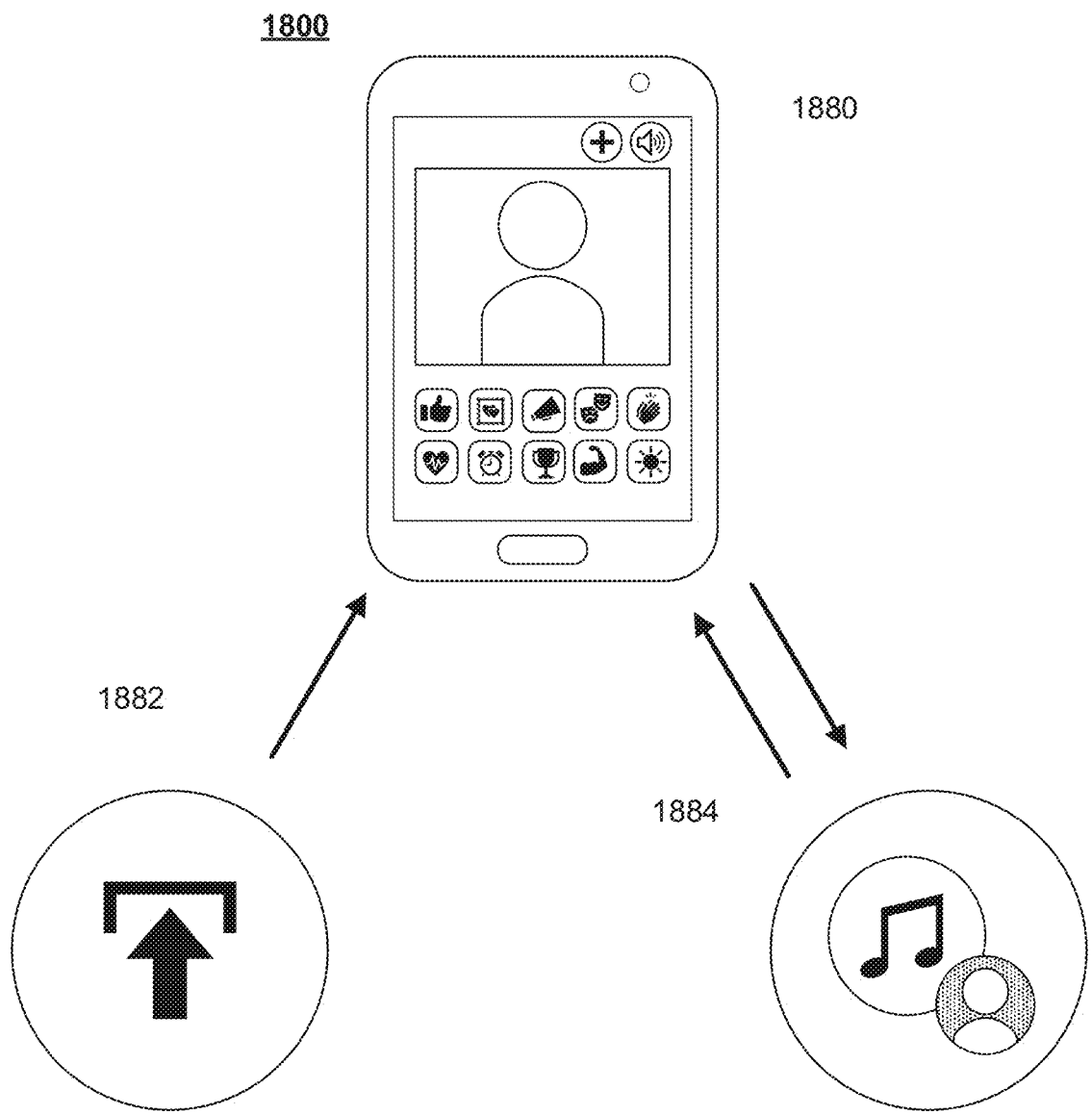
FIG. 18 illustrates an exemplary message device, according to some embodiments of the present disclosure.

Referring now to FIG. 18, an exemplary message device 1800 is illustrated. In some aspects, a message device 1800 may receive media 1882, 1884 that may be played separately or in conjunction with messages. In some implementations, a message device 1800 may comprise media control 1880 that may allow a user to adjust settings and assign media. In some embodiments, media 1882, 1884 may be uploaded by the user, and the media 1882, 1884 may be custom, such as media 1882, 1884 directly captured by the user, captured by a loved one, captured by a physician or psychologist, or captured by the user's coach.

In some aspects, media 1882, 1884 may be from a preset bank of options, such as a central message system. In some embodiments, the preset bank may be organized by media type, originator, message groups, or styles. For example, a user may be able to access a preset bank associated with a specific life coach, club, or healthcare provider.

In some embodiments, a user may be looking for music only, video only, or combinations. For example, a user may find that audio media 1884 is particularly helpful when she is anxious, and video media 1882 is helpful when listening to messages from a loved one. In some aspects, the message device 1800 may be able to detect when the user is speaking and pause audio to allow for concentration. In some implementations, the media settings may be customizable, such as by the user, by their coach, by a loved one, or by a doctor.

Figure 19:
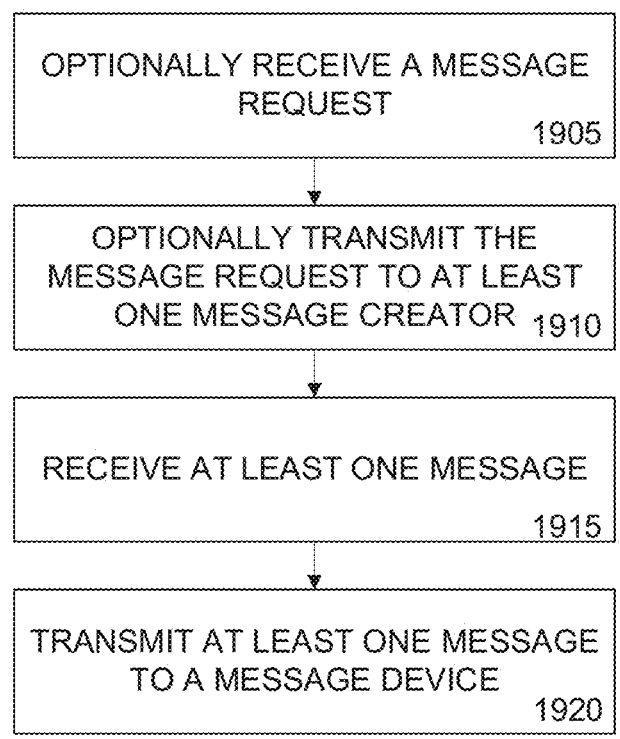
FIG. 19 illustrates exemplary method steps for receiving and sending messages.

Referring now to FIG. 19, a messaging process for the message device is illustrated. In some aspects, at 1905, a message request may be received. In some embodiments, at 1910, the message request may be transmitted to at least one message creator. At 1915, at least one message may be received. At 1920, the at least one message may be transmitted to a message device.

In some embodiments, the system may receive a message request from another user trying to communicate with the other user. In some aspects, a message device may generate an automated message to communicate with another message device based on previous knowledge both owners of the devices may need to communicate.

In some embodiments, the message request may be sent out to a message creator to notify them that a message (or message request) may have been delivered to the recipient. For example, a loved one may have gotten a new message device and want to communicate with another loved one; this may trigger an automated message request to the recipient and then a delivery confirmation may be sent to the sender as well. In some aspects, a loved one may send a message, and a notification may let the user know that a message is waiting for download.

Figure 20:
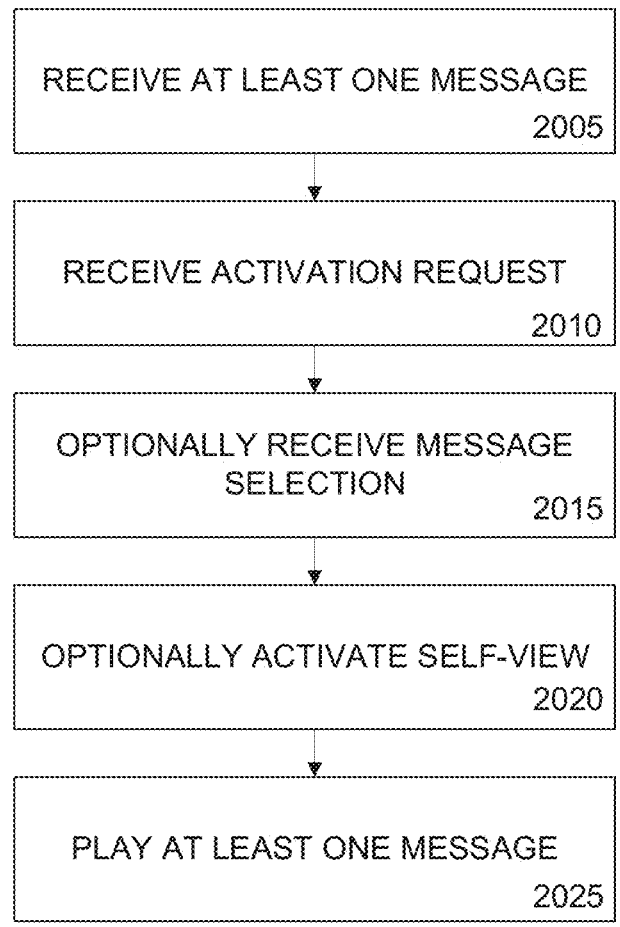
FIG. 20 illustrates exemplary method steps for a visual message reception process.

Referring now to FIG. 20, a process for receiving and playing a message is illustrated. At 2005, at least one message may be received. At 2010, an activation request for a message may be received. In some aspects, at 2015, a message selection may be received. In some embodiments, at 2020, self-view may be activated, such as where the self-mechanism may comprise a forward-facing camera. At 2025, at least one message may be played.

In some embodiments, a message device may receive at least one message at a time but may also receive multiple messages as well. For example, if more than one message is received on the message device it may notify the user in order of precedence, chronologically, or cyclically, as non-limiting examples.

In some aspects, an activation request may trigger playback of a message. For example, a message device may be notified of the name or user behind the message sender and confirm or deny the ability communicate. In some implementations, the user may select to optionally receive messages on their message device. For example, this may allow the user to auto decline any incoming messages from unknown devices across the network.

In some embodiments, the message device may have a toggle on/off self-view activation, which may allow for manual control. In some implementations, the self-view activation may be automatic, wherein activation may be triggered based on predefined conditions. For example, the self-view mechanism may be activated when the message device is opened, powered on, or when a message is played.

Figure 21:
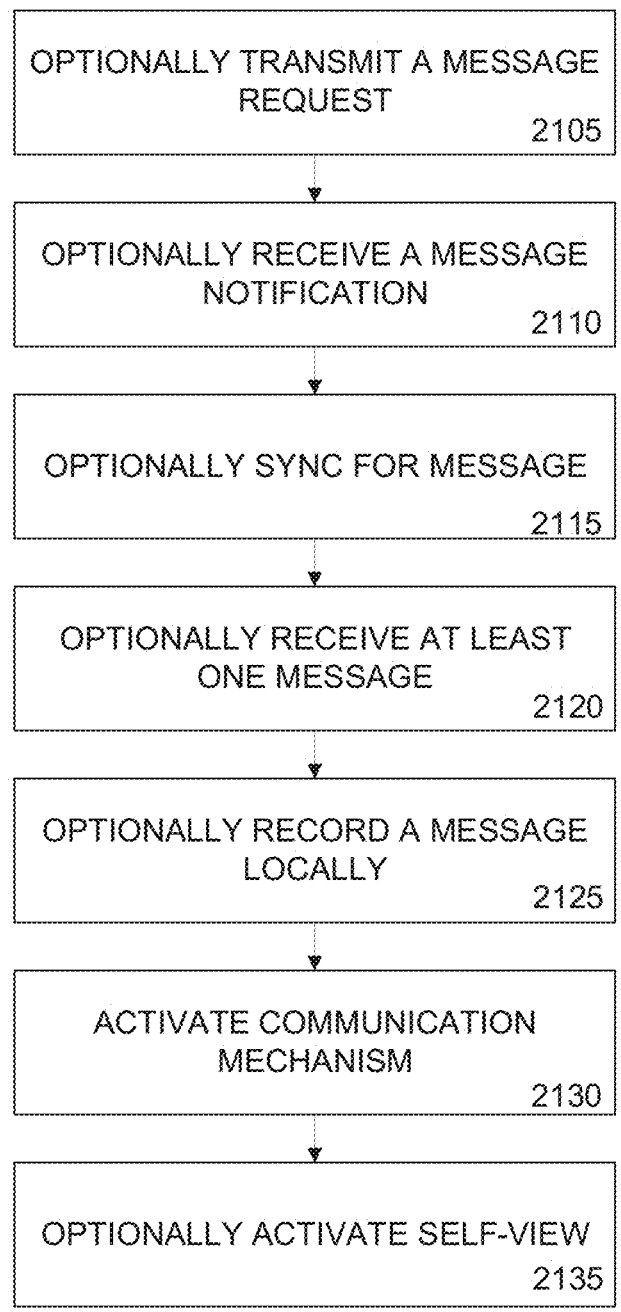
FIG. 21 illustrates exemplary method steps for message device activation.

Referring now to FIG. 21, an activation process for a message device is illustrated. In some aspects, at 2105, a message request may be transmitted. In some implementations, at 2110, a message notification may be received. In some embodiments, at 2115, a message may be synchronized. In some aspects, at 2120, at least one message may be received. In some embodiments, at 2125, a message may be recorded locally. At 2130, a message device mechanism may be activated. In some implementations, at 2135, self-view may be activated.

In some embodiments, the message device may activate a communication mechanism that may allow for communication between any two message devices locally connected. In some aspects, the message device may receive one or more messages at a time. This may depend on internet connection, time sent, time received, distance apart, and other non-limiting factors. In some embodiments the message device my record a message locally from its own microphone. For example, the message device may activate the microphone and locally record any noise in a certain vicinity of the device.

In some aspects, the message device may activate a communication mechanism that may help the device send and receive messages to other devices. For example, when activated the device may have the ability to connect to wireless networks and send and receive messages. In some embodiments, if the communication mechanism is deactivated then the device may not send or receive messages.

In some embodiments the self-view may be activated or deactivated at any time when the message device is in use. In some embodiments the self-view may automatically switch off when not in use to save power. In other embodiments the self-view may switch on automatically when the message device is in use for a video call.

Figure 22:
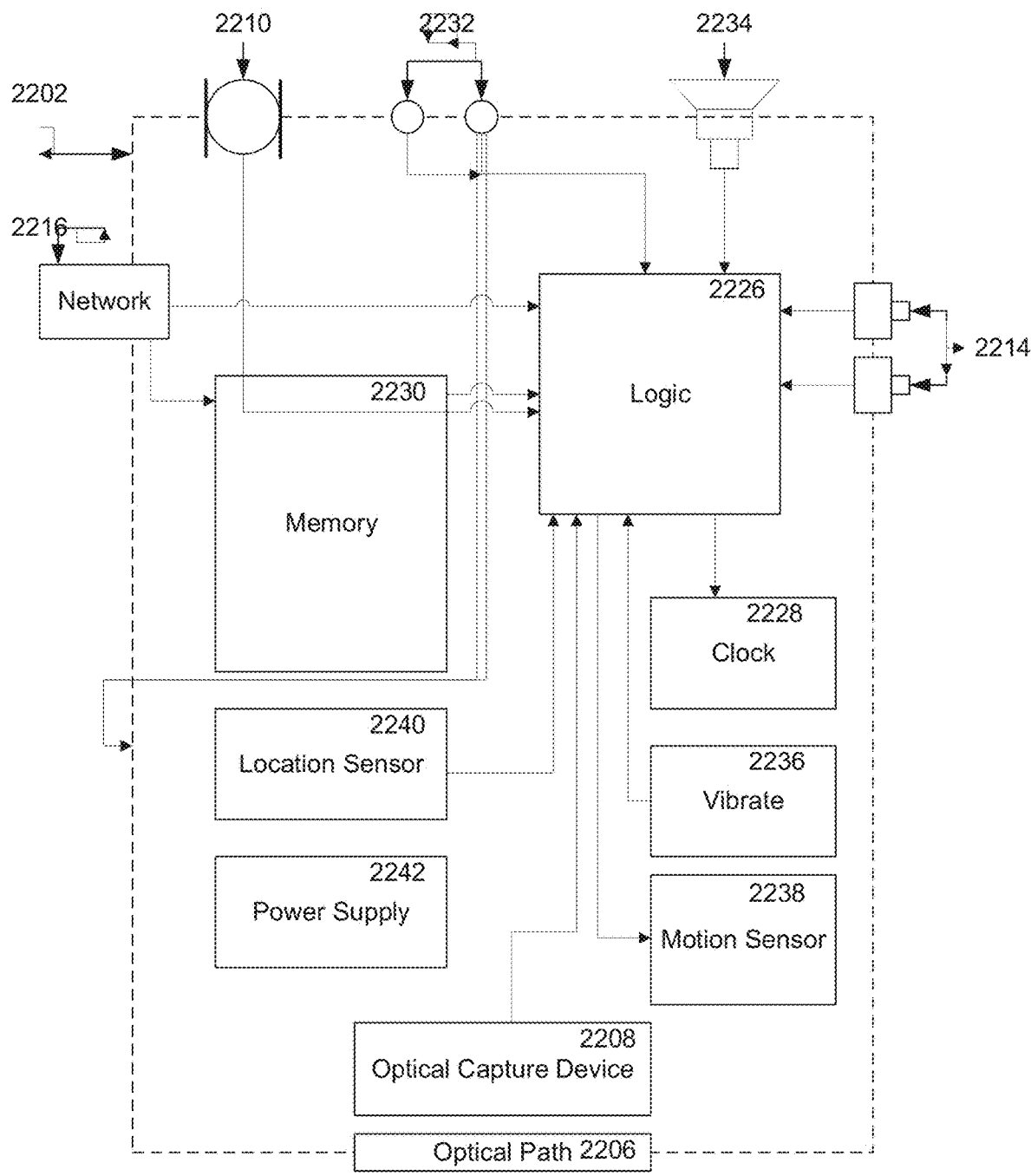
FIG. 22 illustrates an exemplary block diagram of an exemplary embodiment of a message device, according to some embodiments of the present disclosure.

Referring now to FIG. 22, an exemplary block diagram of an exemplary embodiment of a message device 2202 is illustrated. The message device 2202 may comprise an optical capture device 2208, which may capture an image and convert it to machine-compatible data, and an optical path 2206, typically a lens, an aperture, or an image conduit to convey the image from the rendered document to the optical capture device 2208. The optical capture device 2208 may incorporate a Charge-Coupled Device (CCD), a Complementary Metal Oxide Semiconductor (CMOS) imaging device, or an optical sensor of another type.

In some embodiments, the message device 2202 may comprise a microphone 2210, wherein the microphone 2210 and associated circuitry may convert the sound of the environment, including spoken words, into machine-compatible signals. Control mechanism may comprise input facilities 2214 may exist in the form of buttons, scroll-wheels, or other tactile sensors such as touch-pads. In some embodiments, input facilities 2214 may include a touch-screen display. Visual feedback 2232 to the user may occur through a visual display, touchscreen display, or indicator lights. A media playback device may comprise audible feedback 2234 may be transmitted through a loudspeaker or other audio transducer. Tactile feedback may be provided through a vibration module 2236.

In some aspects, the message device 2202 may comprise a motion sensor 2238, wherein the motion sensor 2238 and associated circuitry may convert the motion of the message device 2202 into machine-compatible signals. For example, the motion sensor 2238 may comprise an accelerometer, which may be used to sense measurable physical acceleration, orientation, vibration, and other movements. In some embodiments, the motion sensor 2238 may comprise a gyroscope or other device to sense different motions.

In some implementations, the message device 2202 may comprise a location sensor 2240, wherein the location sensor 2240 and associated circuitry may be used to determine the location of the device. The location sensor 2240 may detect Global Position System (GPS) radio signals from satellites or may also use assisted GPS where the message device may use a cellular network to decrease the time necessary to determine location. In some embodiments, the location sensor 2240 may use radio waves to determine the distance from known radio sources such as cellular towers to determine the location of the message device 2202. In some embodiments these radio signals may be used in addition to and/or in conjunction with GPS.

In some aspects, the message device 2202 may comprise a logic module 2226, which may place the components of the message device 2202 into electrical and logical communication. The electrical and logical communication may allow the components to interact. Accordingly, in some embodiments, the received signals from the components may be processed into different formats and/or interpretations to allow for the logical communication. The logic module 2226 may be operable to read and write data and program instructions stored in a storage mechanism 2230, such as RAM, ROM, flash, or other suitable memory. For example, the storage mechanism 2230 may allow for local storage of one or more messages, message playback data, message data, and recitation data. In some aspects, the logic module 2226 may read a time signal from the clock unit 2228. In some embodiments, the message device 2202 may comprise an on-board power supply 2242. In some embodiments, the message device 2202 may be powered from a tethered connection to another device, such as a Universal Serial Bus (USB) connection.

In some implementations, the message device 2202 may comprise a communication mechanism 2216, which may allow the message device 2202 to communicate with one or more external network and external message device, such as within a message device system, as illustrated in FIG. 18, as a non-limiting example. The communication mechanism 2216 may provide two-way data communication. For example, the communication mechanism 2216 may operate according to an internet protocol. As another example, the communication mechanism 2216 may comprise a local area network (LAN) card, which may allow a data communication connection to a compatible LAN. As another example, the communication mechanism 2216 may comprise a cellular antenna and associated circuitry, which may allow the message device to communicate over standard wireless data communication networks. In some implementations, the communication mechanism 2216 may comprise a Universal Serial Bus (USB) to supply power or transmit data. In some embodiments, other wireless links known to those skilled in the art may be implemented.

In some aspects, the internal components and how they may be set up inside the message device for best use of space and efficiency. In some embodiments, the internal components of the message board may be arranged in a different manner based on the variation of the message device produced. In some implementations, the different components may vary in size based on the specs of the message device selected by the user. For example, the memory component may be larger if the user selects to purchase a bigger memory space in their message device.

In some embodiments, the message device may come with extra internal components when purchased or may be purchased after purchase of the message device. For example, if the user wishes to change out the power supply for a longer lasting solution, it may be purchased and installed by the user later.

Figure 23:
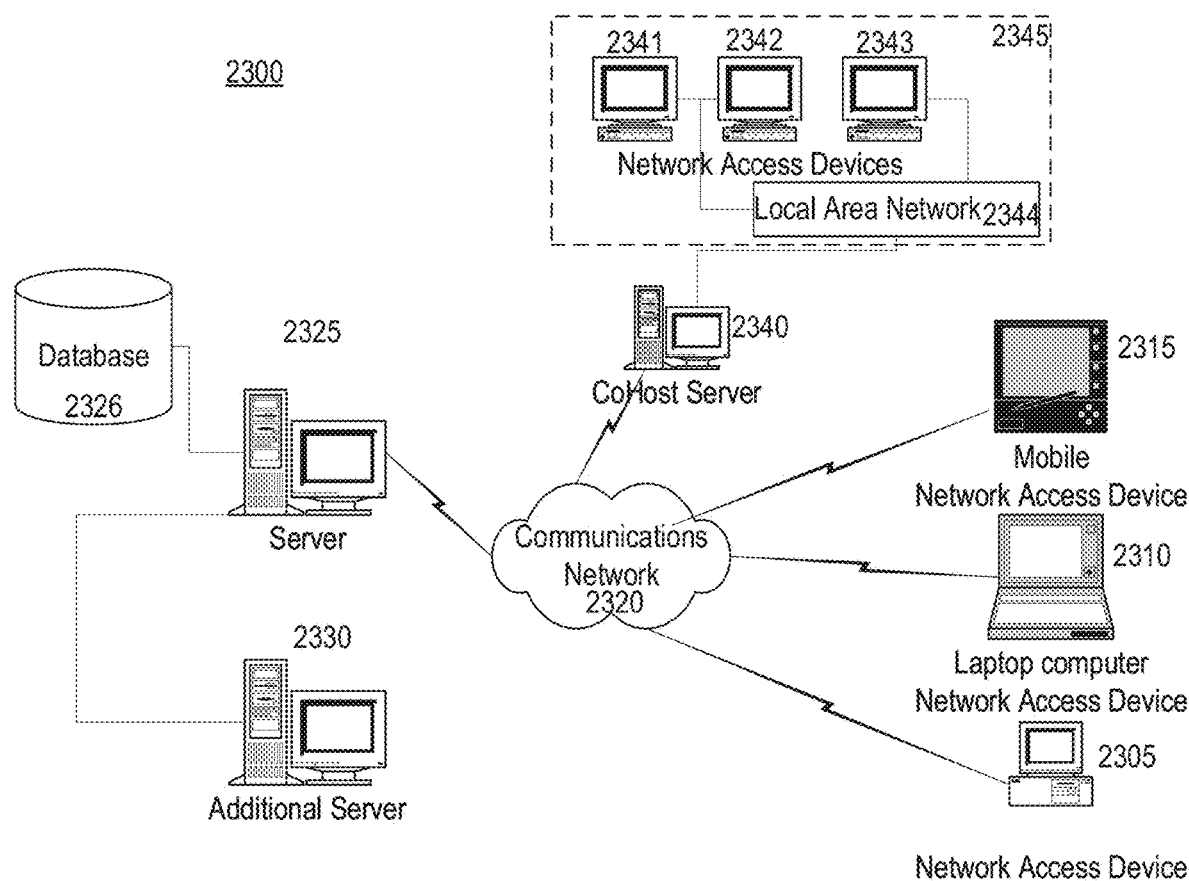
FIG. 23 illustrates an exemplary processing and interface system, according to some embodiments of the present disclosure.

Referring now to FIG. 23, an exemplary processing and interface system 2300 is illustrated. In some aspects, access devices 2315, 2310, 2305, such as a paired portable device 2315 or laptop computer 2310 may be able to communicate with an external server 2325 though a communications network 2320. The external server 2325 may be in logical communication with a database 2326, which may comprise data related to identification information and associated profile information. In some embodiments, the server 2325 may be in logical communication with an additional server 2330, which may comprise supplemental processing capabilities.

In some aspects, the server 2325 and access devices 2305, 2310, 2315 may be able to communicate with a cohost server 2340 through a communications network 2320. The cohost server 2340 may be in logical communication with an internal network 2345 comprising network access devices 2341, 2342, 2343 and a local area network 2344. For example, the cohost server 2340 may comprise a payment service, such as PayPal or a social network, such as Facebook or a dating website.

a communication network that may relay all information including but not limited to, messages, videos, icons, etc. In some embodiments, information may be accessed from different networks on laptops, message devices or other smart devices. For example, a message may accidentally be deleted by the user, however, may be recovered from another smart device on the same, or different network.

In some aspects, information from message devices may be saved into remote databases for future use from a cloud like storage system. In some aspects, there may exist a local area network where messages may be sent from device to device as long as each message device is connected to the network.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A message device comprising:
    a self-view mechanism configured to portray a live self-view of a user;
    at least one microphone;
    a storage mechanism configured to store a plurality of messages, each comprising one or more audio, video, or image;
    a media playback device configured to play the plurality of messages;
    a communication mechanism configured to one or both receive and record messages;
    a control mechanism that controls playback of the plurality of messages; and
    at least one logic module, wherein the at least one logic module operates to read one or more program instructions that cause the message device to:
        determine that the media playback device is playing at least one of the plurality of messages;
        automatically activate the at least one microphone during playback of the at least one of the plurality of messages; detect that the user is speaking; analyze audio received from the user, wherein an analysis of the audio identifies at least one mood of the user; and wherein the message device tracks usage of the media playback device.

2. The message device of claim 1, wherein access to at least a portion of the plurality of messages is remotely controllable.

3. The message device of claim 1, wherein the message device comprises a foldable compact device, wherein the foldable compact device comprises a first portion and a second portion, wherein the first portion is connected to the second portion via at least one hinge, wherein the foldable compact device is alterable between an open position and a closed position, wherein an inner surface of the first portion is proximate to an inner surface of the second portion when the foldable compact device is in the closed position, wherein the inner surface of the first portion comprises the self-view mechanism.

4. The message device of claim 3, wherein an outer surface of at least one of: the first portion and the second portion comprises a sensory cover, wherein the sensory cover comprises at least one of: a textured surface, a zipper, a spinner, an amount of squeezable material, an amount of soft material, and a tassel.

5. The message device of claim 1, wherein the message device stores a plurality of messages.

6. The message device of claim 1, wherein the message device organizes the plurality of messages based on message type.

7. The message device of claim 1, wherein the message device self-view mechanism comprises a mirror.

8. The message device of claim 1, wherein the message device comprises a plush toy, and wherein the self-view mechanism is located on an exterior of the plush.

9. The message device of claim 1, wherein the message device self-view mechanism is configured for facial recognition.

10. The message device of claim 9, wherein facial recognition detects the at least one mood of the user.

11. The message device of claim 10, wherein suggested media is based on a detected mood.

12. The message device of claim 1, wherein the self-view mechanism comprises at least one camera and at least one display screen, wherein the one or more program instructions read by the at least one logic module further cause the message device to:
    automatically activate the self-view mechanism during playback of the at least one of the plurality of messages.

13. A message device adapter comprising:
    at least one self-view mechanism configured to provide a live self-view of a user;
    at least one microphone;
    a storage mechanism configured to store at least one message, wherein the at least one message comprises audio;
    a media playback device configured to play the at least one message;
    a communication mechanism;
    a control mechanism that controls playback of the at least one message;
    at least one logic module, wherein the at least one logic module operates to read one or more program instructions that cause the message device adapter to:
        determine that the media playback device is playing at least one of the plurality of messages;
        automatically activate the at least one microphone during playback of the at least one of the plurality of messages; detect that the user is speaking; analyze audio received from the user, wherein an analysis of the audio identifies at least one mood of the user; and wherein the message device tracks usage of the media playback device; and
    an attachment mechanism configured to attach the message device adapter to the at least one self-view mechanism.

14. The message device adapter of claim 13, wherein the at least one self-view mechanism comprises a mountable or free-standing reflective surface.

15. The message device adapter of claim 13, wherein the at least one self-view mechanism comprises a mirror located in a vehicle.

16. The message device adapter of claim 13, wherein the message device adapter is configured to access and analyze the live self-view of the user, wherein analysis comprises facial recognition.

17. A system of message devices comprising
    a plurality of message devices, wherein each of the plurality of message devices comprises:
        a self-view mechanism configured to provide a live self-view of a user;
        at least one microphone;
        a communication mechanism configured to one or both receive and record messages, wherein the communication mechanism of each of the plurality of message devices allows for wireless communication between the plurality of message devices;

a storage mechanism configured to store a plurality of messages, each comprising one or more audio, video, or images, wherein wireless communication between the plurality of message devices shares at least a portion of the plurality of messages;

a media playback device configured to play the plurality of messages;

a control mechanism that controls playback of the plurality of messages; and at least one logic module, wherein the at least one logic module operates to read one or more program instructions that cause the message device adapter to:
  determine that the media playback device is playing at least one of the plurality of messages;
  automatically activate the at least one microphone during playback of the at least one of the plurality of messages; detect that the user is speaking; analyze audio received from the user, wherein an analysis of the audio identifies at least one mood of the user; and wherein the message device tracks usage of the media playback device.

18. The system of message devices of claim 17, wherein at least a portion of the plurality of message devices are remotely controllable.

* * * * *